UNITED STATES PATENT OFFICE.

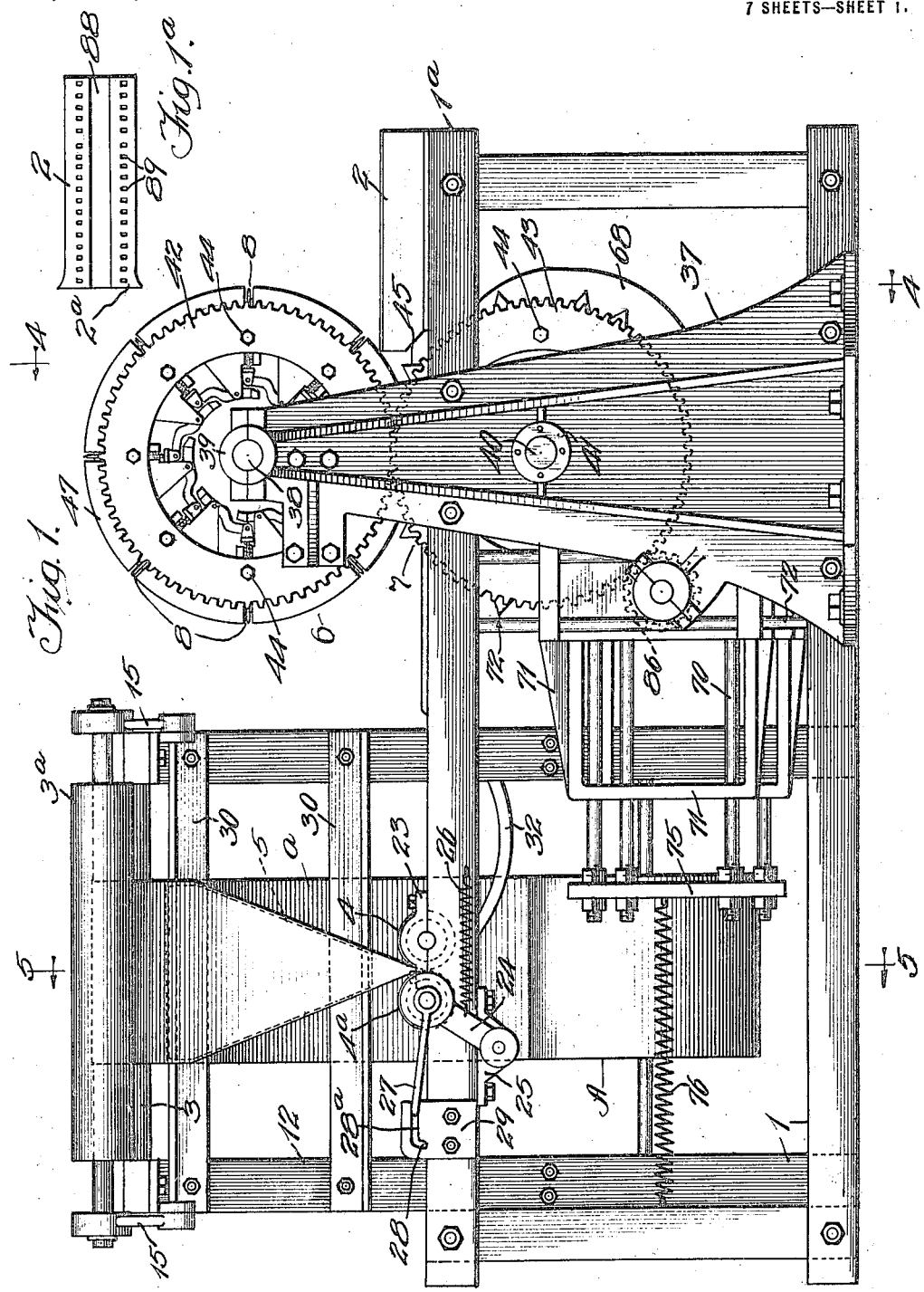

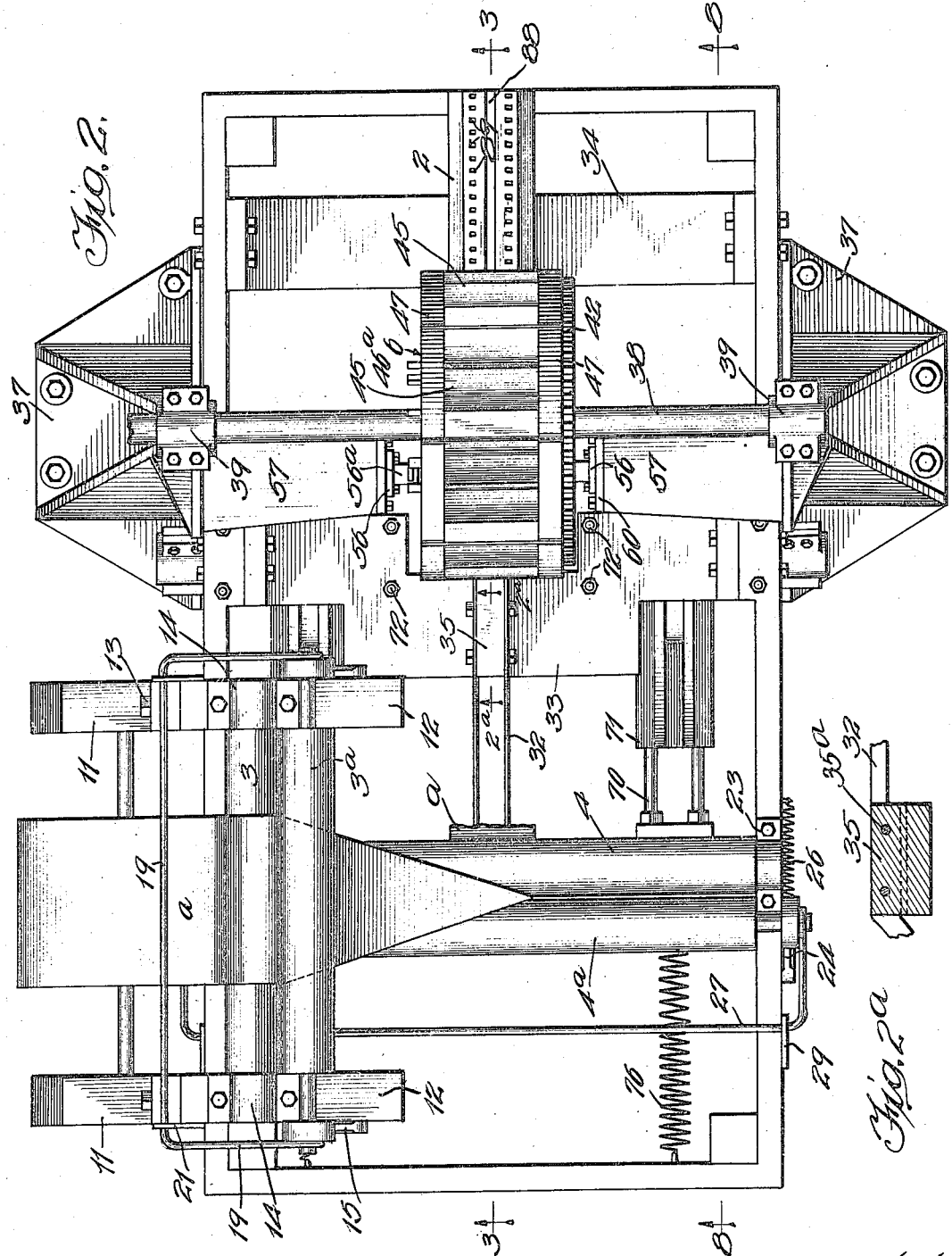

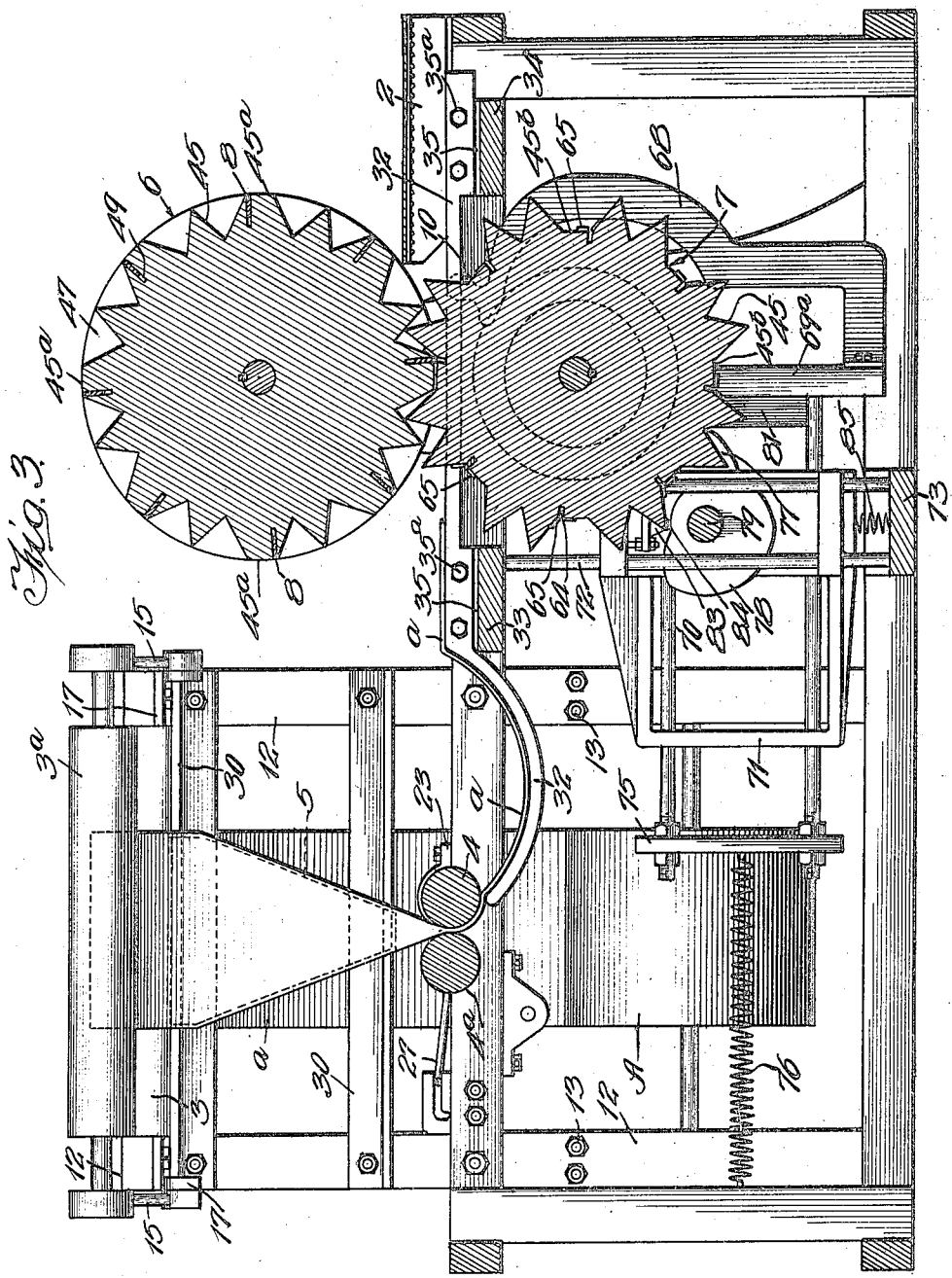

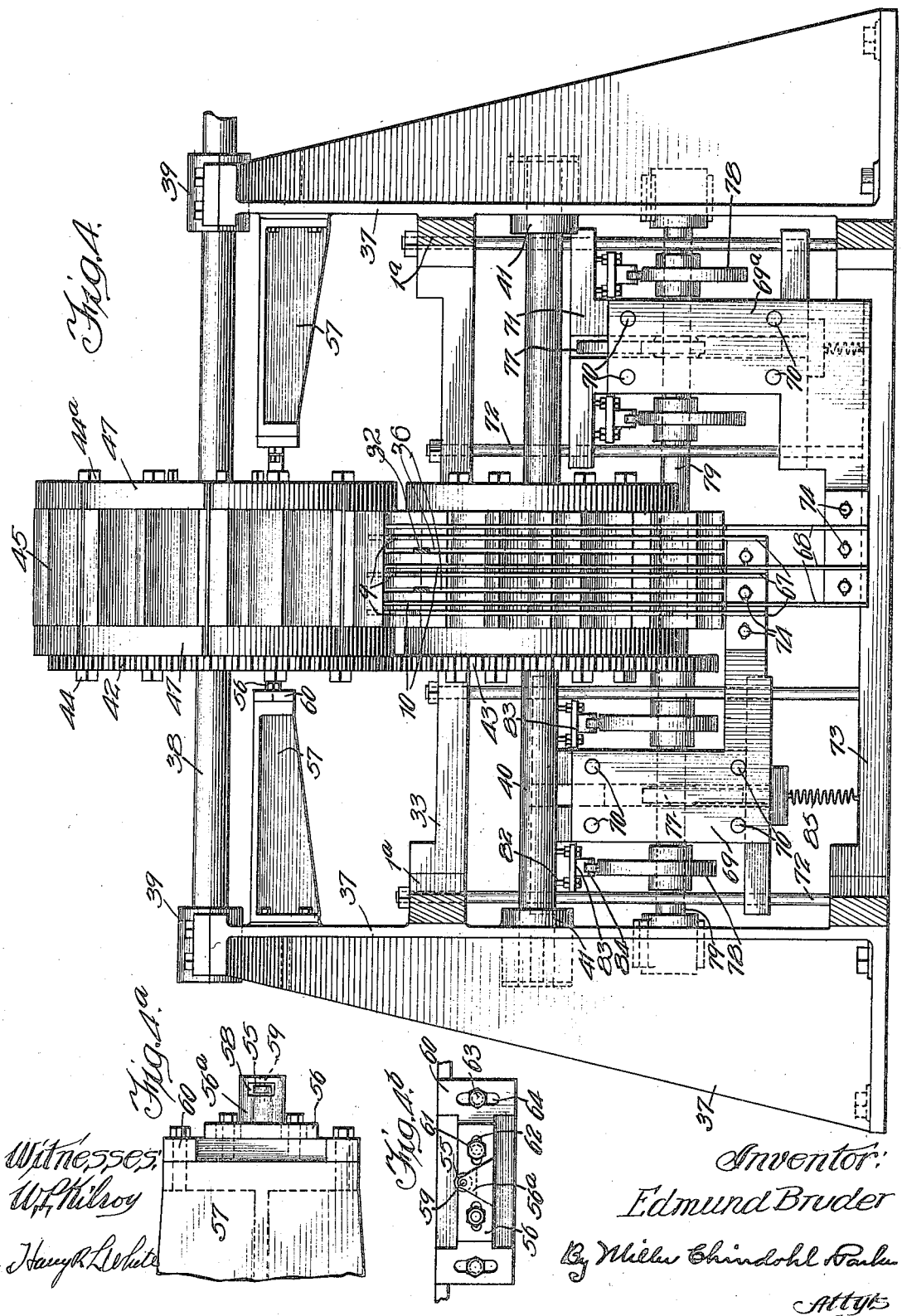

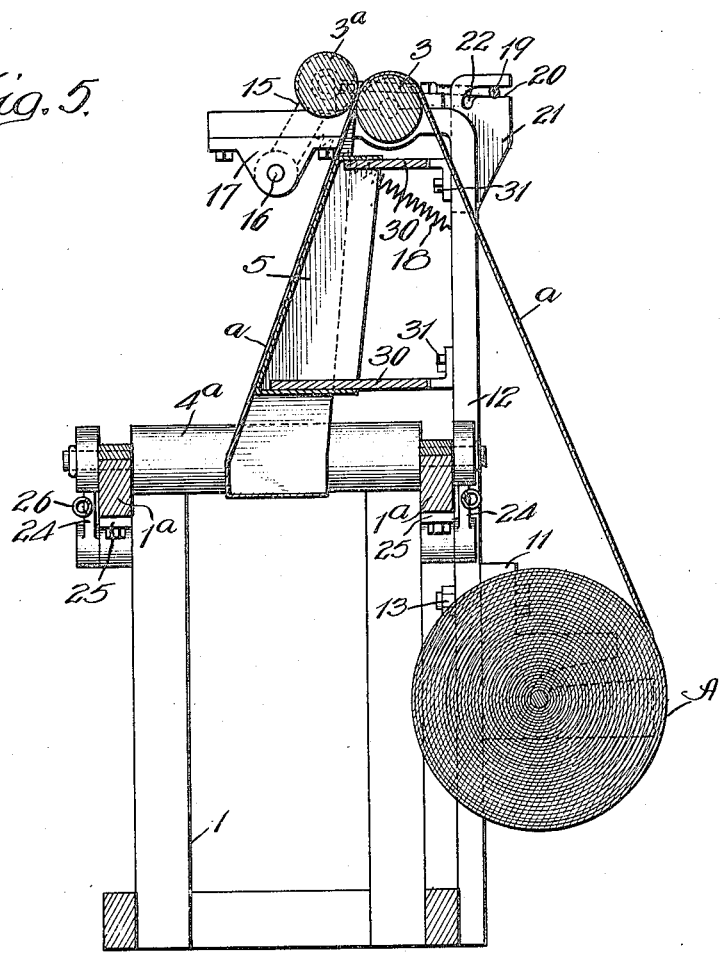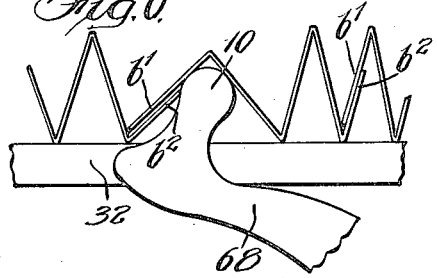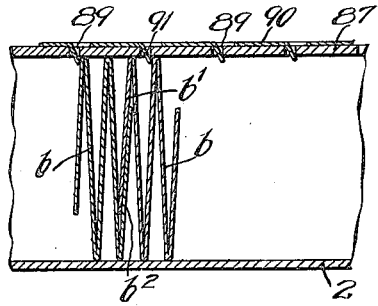

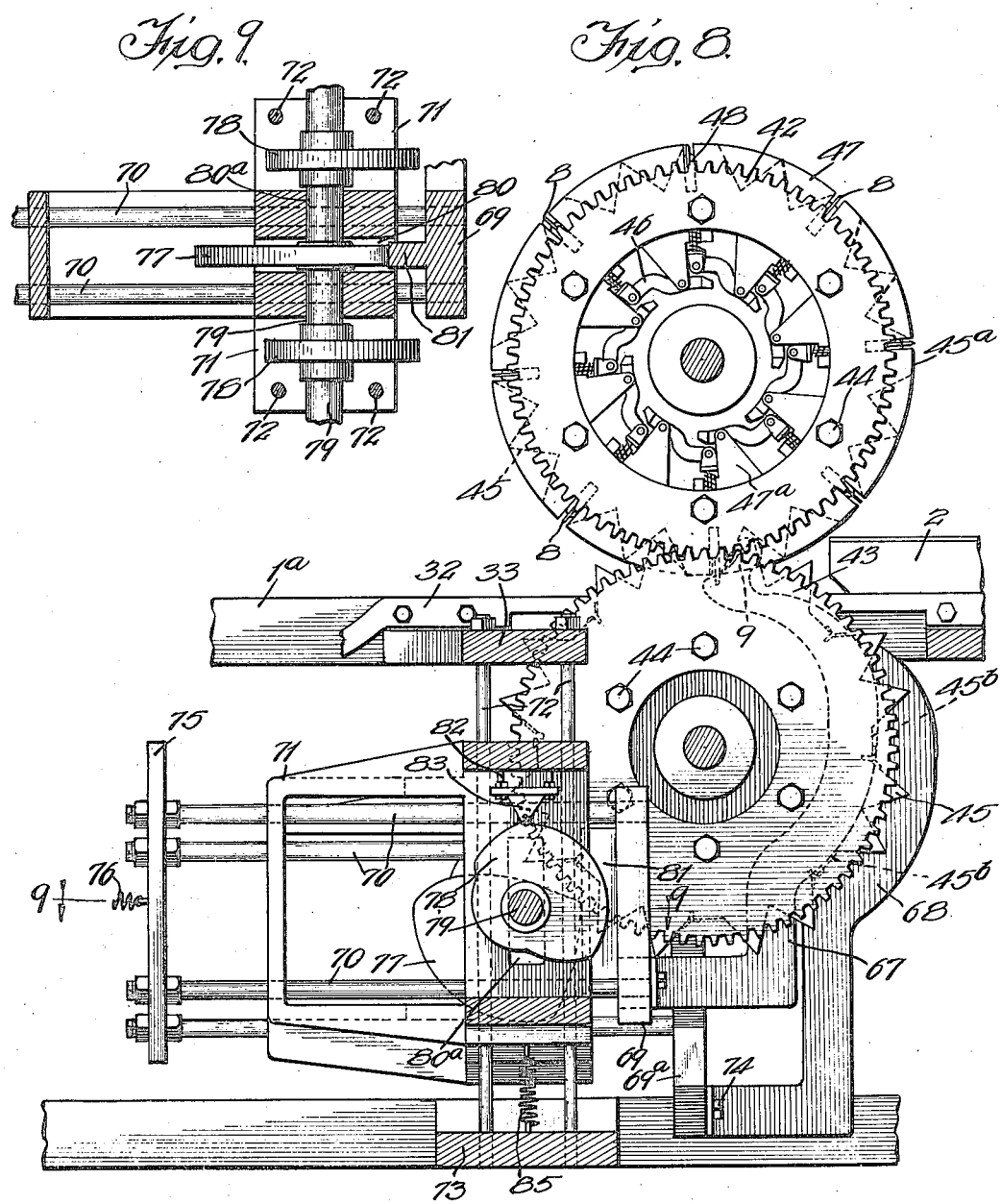

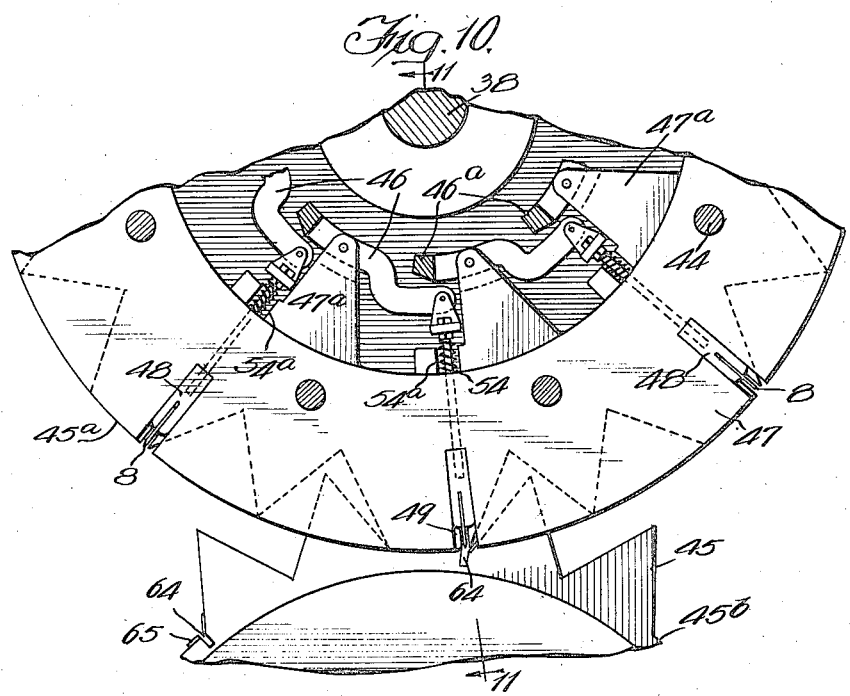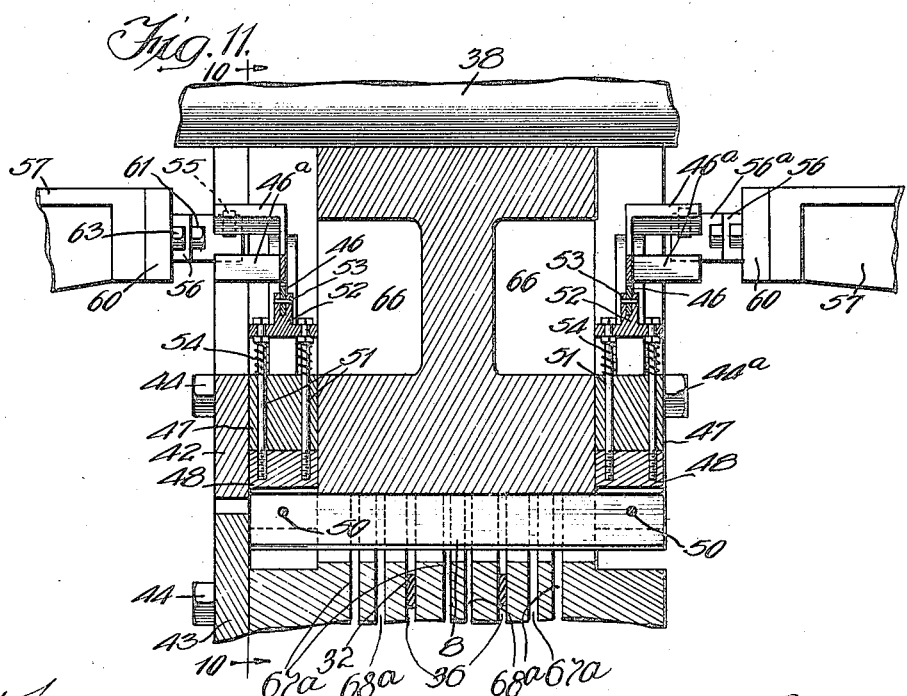

EDMUND BRUDER, OF CHICAGO, ILLINOIS, ASSIGNOR OF ONE-HALF TO HAROLD I. KOPPELMAN, OF WILMETTE, ILLINOIS.

PAPER-TOWEL AND LIKE MACHINE.

1,424,709.        Specification of Letters Patent.        Patented Aug. 1, 1922.

Application filed January 19, 1918. Serial No. 212,592.

*To all whom it may concern:*

Be it known that I, EDMUND BRUDER, a citizen of the United States, residing at Chicago, in the county of Cook and State of Illinois, have invented certain new and useful Improvements in Paper-Towel and like Machines, of which the following is a specification.

The invention relates to machines for producing folded paper articles such as towels or napkins, and the general object of the invention is to provide a machine of improved construction which is capable of producing such articles in commercial quantities with the separate articles associated together when discharged from the machine and ready to be placed in suitable dispensers for use.

More specifically, one object of the invention is to provide a machine of advantageous construction which is adapted to produce paper towels, napkins, or the like, from a single continuous strip of paper by successively folding the strip, cutting it into separate sheets and lapping or interfolding adjacent ends of the sheets as they are discharged into a container or chute.

A further object of the invention is to provide folding, cutting and interfolding mechanisms of comparatively simple construction and which are rapid and positive in operation.

The objects of the invention thus generally stated, together with other and ancillary advantages, are attained by the construction and arrangement illustrated in the accompanying drawings forming part hereof, in which Figure 1 is a side elevation of a preferred embodiment of my invention. Fig. 1ª is a top plan view of the chute into which the folded articles are discharged. Fig. 2 is a top plan view of the machine. Fig. 2ª is a sectional view on line 2ª, Fig. 2 showing a detail of construction. Fig. 3 is a longitudinal sectional view on line 3—3 of Fig. 2. Fig. 4 is a view looking into the rear end of the machine taken in the plane of line 4—4 of Fig. 1. Fig. 4ª is a fragmental top plan view and Fig. 4ᵇ is a fragmental side view of the actuating means for the severing mechanism. Fig. 5 is a sectional view taken on line 5—5 of Fig. 1, showing the forward portion of the machine. Fig. 6 is a fragmental detail view showing a portion of the interfolding means in operation. Fig. 7 is a fragmental vertical sectional view through the chute at the rear of the machine, showing the manner in which the folded articles are discharged into the chute. Fig. 8 is a fragmental sectional view showing the folding drums and the lapping or interfolding mechanism, the view being taken in the plane of line 8—8 of Fig. 2. Fig. 9 is a transverse fragmental sectional view taken in the plane of line 9 of Fig. 8, through a portion of the interfolding mechanism.

Fig. 10 is an enlarged fragmental detail view of the folding drums taken on line 10—10 of Fig. 11. Fig. 11 is a transverse view of the same taken on line 11—11 of Fig. 10.

For convenience, in the following description the machine will be referred to as a paper towel machine, although it will be understood that the invention is not thus limited, but may be employed for folding paper napkins or other paper articles. It will also be understood that while a single embodiment of the invention is illustrated and described herein, the machine is capable of modifications and I do not desire to be limited in the interpretation of the appended claims, except as may be necessitated by the state of the prior art.

The machine comprises a supporting frame 1, upon one end of which a roll A of paper is arranged to be supported and upon the other end of which a chute 2 is mounted for receiving towels *b* which have been formed from the continuous strip of paper *a* drawn from the roll A, by various devices mounted on the frame and operating upon the strip as it passes through the machine. Briefly, such operating devices consist of two sets of rolls 3—3ª and 4—4ª mounted on the forward end of the machine, between which sets of rolls is supported an apron 5 arranged to guide the strip *a* from rolls 3 and 3ª into the rolls 4 and 4ª, so as to form a single longitudinal fold in the strip. From the rolls 4 and 4ª the folded strip passes between a pair of toothed rotating drums 6 and 7 which impart to the strip a zigzag form by making a plurality of transverse creases or folds therein, one of said drums having associated therewith a plurality of knives or cutting blades 8 arranged to be operated in the rotation of the drums to periodically sever the folded strip into separate sheets or towels $b$. As the towels pass from between the toothed drums 6 and 7, a plurality of lapping fingers 9 and 10 operate thereon to interfold the adjacent ends of adjoining towels within the first and last transverse folds respectively of the towels, as illustrated in Fig. 6. The towels, as they are discharged into the chute 2, thus assume the relationship shown in Fig. 7. It will be apparent that by reason of such relationship when the towels are placed into a dispenser the removal of one towel will facilitate the removal of the succeeding towel by drawing with it the adjacent interfolded end of such succeeding towel into position to be conveniently grasped by the user.

Referring to Figs. 1, 2, 3 and 5: The roll A of paper is mounted near the forward end of the frame 1 at one side thereof in suitable brackets 11, from which roll the paper may be drawn continuously through the pairs of rolls 3—$3^a$ and 4—$4^a$. The rolls 3—$3^a$ are mounted a substantial distance above the main frame 1 upon a pair of standards 12. Said standards are inverted L-shaped in form and have their upright portions or stems bolted to the side of the frame and their horizontal portions extended transversely over the frame. The brackets 11 for supporting the rolls A are secured to the lower upright portions of said standards as by means of bolts 13 and the rolls 3—$3^a$ are mounted upon the horizontal portions of said standards. The rolls 3—$3^a$, as well as the roll A, thus extend longitudinally of the machine frame.

The roll 3 is journaled in suitable bearings 14 carried by the standards 12, while the roll $3^a$ is preferably journaled in the free ends of a pair of arms 15 pivoted at 16 in bearing brackets 17 secured to the underside of the horizontal portions of said standards. A spring 18 having one end secured to the standards and its other end fastened to one of the arms 15 serves to normally hold the roll $3^a$ in contact with the roll 3, but the roll $3^a$ may be readily swung into inoperative position to permit the strip of paper $a$ to be freely moved between said rolls 3 and $3^a$. Means are preferably provided for holding said movable roll $3^a$ in its releasing or inoperative position when desired, comprising a U-shaped member or rod 19 (Fig. 2) having its free ends connected to the opposite ends of the roll $3^a$ and its yoked end slidable in slots 20 (Fig. 5) of brackets 21 secured to each of the standards 12. Said slots 20 are provided with depressions or notches 22 arranged to receive the yoked end of the member 19 when the roll $3^a$ has been swung into inoperative position out of contact with the roll 3.

The rolls 4—$4^a$ are mounted transversely of the frame 1 on the horizontal longitudinally extending top beams $1^a$, preferably in the same manner that the rolls 3—$3^a$ are mounted on the standards 12. The roll 4 is stationarily mounted in bearing brackets 23 (Fig. 1) and the roll $4^a$ is journaled on the ends of the arms 24 mounted in bearing brackets 25 on the underside of said beams $1^a$. A spring 26 extending between one of said arms and the machine frame normally holds the roll $4^a$ in contact with the roll 4 and a U-shaped member 27 secured to the opposite ends of the roll $4^a$ is arranged to engage in a notch 28 formed in a slot $28^a$ of a bracket 29 secured to the side of the frame beam $1^a$.

As the paper passes from the rolls 3—$3^a$ into the rolls 4—$4^a$ a longitudinal fold is imparted thereto, as by means of the apron 5. Said apron may be of any well known or preferred construction and is supported by means of a pair of brackets 30 secured to the standards 12 as by means of bolts 31.

From the rolls 4—$4^a$ the continuous strip $a$ passes over a pair of guide bars 32 between the rotating toothed drums 6 and 7, to receive the transverse folds and to be severed into separate sheets to form the towels, said drums also serving to draw the strip from the the rolls 3—$3^a$ and 4—$4^a$. The guide bars 32 are spaced a short distance apart (Fig. 2) in order to support the opposite edges of the sheet and are supported by crosspieces 33 and 34 having flanged ends bolted to the longitudinal beams $1^a$ on opposite sides of the frame and near the central portion and rear end thereof, respectively, upstanding lugs 35 being provided on said crosspieces to which the bars 32 are secured as by means of bolts $35^a$. The forward ends of said bars are preferably curved downwardly slightly, into position to receive the strip $a$ from the rolls 4—$4^a$, and in order to properly feed the strip between the toothed drums 6 and 7 the bars are passed through annular grooves 36 (Fig. 4) provided in the periphery of the lower drum.

A pair of upright standards 37 are bolted to opposite sides of the frame 1 near the rear end thereof for supporting the toothed drums 6 and 7. The upper drum 6 is fixed upon a shaft 38 which is journaled in bearings 39 upon the upper ends of the standards, and the lower drum 7 is mounted upon a shaft 40 journaled in bearings 41 near the centers of said standards, the drums being so positioned with reference to each other that their peripheries meet substantially in the plane of the top of the frame 1. Said drums are geared together by means of annular rings 42 and 43 secured to one side of the drums as by means of bolts 44 and having intermeshing gear teeth, and the drums are rotated by means of power applied to the shaft 38 of the upper drum, which shaft is extended as shown in Fig. 4 for this purpose.

The drums are each provided throughout their peripheries with teeth 45 for producing the transverse folds in the strip as it passes between them. A zigzag form is imparted to the strip by such folds so that when the severed sheets or towels *b* pass from between the drums they assume an upright position on the support formed by the bars 32. The doubling of the strip by the preliminary longitudinal fold imparted thereto serves to assist the towels in maintaining such upright position by reason of the added stiffness of the sheet when doubled.

A plurality of cutting blades 8 are provided at spaced intervals throughout the periphery of the upper drum; and the means for operating said cutting blades to sever the continuous strip into the separate sheets or towels *b* in the rotation of the drums 6 and 7 comprises a lever or arm 46 (Figs. 8, 10 and 11) for each blade mounted within an annular supporting ring 47 carried at opposite sides of the upper drum, which for this purpose is made of less width than the lower drum. The supporting ring on the side of the drum adjacent the gear ring 42 is located between the drum and said gear ring and is retained in place by means of the ring-securing bolts 44, and the opposite supporting ring is secured to the side of the drum as by means of bolts 44$^a$. Each of the blades 8 is carried by a block 48 slidably mounted in a transverse radial slot 49 provided in said supporting ring 47 and the periphery of the drum, the blades being pivoted to the block as by means of a central pivot pin 50 (Fig. 11). Each of the blocks in turn is pivotally connected to one end of one of the arms 46 by means of a pair of radial rods 51 and an inverted T-shaped bracket 52. The rods 51 are slidable in suitable openings in the supporting ring 47 and are secured at their opposite ends to the block 48 and bracket 52, respectively, while the bracket is connected to the arm as by means of a pivot pin 53. A spring 54 surrounding each of the rods 51 and bearing between the supporting ring 47 and the bracket 52 serves to normally hold the cutting blades in inoperative position. The arms 46 are pivotally mounted between their ends upon radially extending brackets 47$^a$ formed on the inner periphery of the annular supporting rings 47, and said brackets are provided with recesses 54$^a$ forming seats for the springs 54.

The arms 46 are arranged to be operated in the rotation of the drum 6, to actuate the cutting blade, by means of a pair of stationary elements carried by the frame and engaging with the free ends of the arms, which for this purpose are each provided with a lug 46$^a$ extending outwardly parallel to the axis of the drum beyond the face of the supporting ring 47 on the drum 6. Each of said operating elements for the arms preferably comprises a roller 55 (Figs. 4$^a$, 4$^b$ and 11) carried by a block 56 which is supported by a bracket or arm 57 secured to the upright standards 37. The roller 55 may be mounted within a slot 58 on a pivot 59 in the upper edge of an outwardly extending triangularly shaped projection 56$^a$ on the block 56, while said block 56 is adjustably mounted upon a plate 60 which in turn is adjustably secured upon the outer end of the supporting arm 57 which is provided with a flat face for this purpose. The block 56 is secured to the plate 60 as by means of bolts 61 entered through horizontal slots 62 in the block, while the plate 60 is secured to the arm 57 as by means of a pair of bolts 63 entered through vertical slots in the ends of the plate. By this construction it will be seen that the position of the roller 55 may be readily varied either horizontally or vertically, whereby the operating ring 46$^a$ on the ends of the arm 46 will engage with said roller at the proper time to actuate the cutting blade 8. In order that a shearing action will be imparted to the cutting blades, one of the rollers 55 is positioned to engage the ring 46$^a$, which operates one end of the cutting blade, slightly before the other roller at the opposite side of the drum engages with the lug which operates the other end of the cutting blade. In the periphery of the lower drum 7 are provided a plurality of transverse slots 64 which are arranged to receive the cutting blades when operated and to cooperate therewith in the severing operation, and preferably a plurality of buttons 65 of rubber or the like are provided adjacent the opposite edges of the slots 64, in the lower drum, in which the cutting blades operate, to firmly grip the paper and prevent any slipping thereof, thus assisting in the severing operation.

For convenience in assembling the parts of the severing mechanism, the opposite sides of the upper drum adjacent the inner edge of the supporting rings 47 may be provided with annular cavities 66 (Fig. 11).

The lapping fingers 9 and 10 for interfolding each end of the severed sheets or towels within the adjacent fold of the next adjoining towel, for the purpose above stated, are arranged at the rear of the toothed drums 6 and 7 in position to operate upon the severed towels as they emerge in their folded form from said drums, and mechanism for alternately moving said fingers in a direction corresponding to the direction of movement of the teeth of the drums and to initial position again is mounted in the machine frame at opposite sides of the lower drum (Figs. 3, 4, 8 and 9). The fingers 9 and 10, of which three are preferably provided of each, are mounted upon upright arms 67 and 68, respectively, and said arms 67 and 68 in turn are carried by plates 69 and 69ª of the operating mechanism. The arms 67 and 68 operate in annular grooves 67ª and 68ª respectively, (Fig. 11) in the lower drum, and near their upper ends are curved to conform to the shape of the drums in order that the fingers on the upper ends of the arms may extend forwardly into the space between the drums, and the arms 67 are made somewhat shorter than the arms 68 so that the plates 69 and 69ª upon which the arms are mounted will not interfere with each other in their operation, the operating mechanism of one arm being so timed and arranged with reference to the mechanism for the other arm that the fingers carried by the arms operate upon alternate towels. Said plates 69 and 69ª are each fixed upon the rear ends of a plurality of horizontal rods 70 (four being shown herein, Fig. 4), which rods are slidably mounted in a frame 71 which in turn is slidably mounted on a plurality of vertical rods 72 extending between the upper crosspiece 33 and a lower crosspiece 73 of the machine frame. The finger-carrying arms are secured to the plate 69 as by means of bolts 74 (Fig. 4), while the forward ends of the rods upon which the plate 69 is mounted are fastened to a plate 75 connected by means of a coiled spring 76 to the forward end of the machine frame. Said spring thus serves to move the plate 69 and its finger-supporting arms forwardly. The frame 71 has an upright I-shaped rear portion and a forwardly-extending bracket, each of which portions is provided with openings for guiding the horizontally-sliding rods 70. Said plate 69 and frame 71 are arranged to be actuated to move the lapping fingers secured to the plate by means of cams 77 and 78 fixed upon a transverse shaft 79, the opposite ends of which are journaled in the upright standards 37 at opposite sides of the frame 1. For this purpose the upright I-shaped portion of the frame 71 is provided at its center with a longitudinal vertical slot 80 (Fig. 9) in which the cam 77 is arranged to operate and to bear upon a cam block 81 carried by the plate 69 upon its forward face; and with a transverse vertical slot 80ª (Fig. 8) to permit vertical movement of the frame with reference to the cam shaft 79. The cams 78 are preferably provided on opposite sides of the upright I-shaped portion of the frame 71, but between the horizontal ledges at the upper and lower ends thereof. From each of said upper ledges is suspended, upon rods 82, a bracket 83 having a roller 84 thereon arranged to operate upon one of the cams 78. A coiled spring 85 extending between said vertically movable frame and the lower crosspiece 73 tends to maintain each of the rollers 84 in contact with its cam 78 at all times, just as the spring 76 serves to maintain the bearing block 81 in contact with the cam 77 at all times. A gear wheel 86 (Fig. 1) fixed upon the cam shaft is arranged to mesh with the gear ring 43 on the lower drum 7 to rotate the shaft and cams thereon and thus to actuate the plate 69 and frame 71.

It will be seen that by the construction and arrangement set forth when the two sets of cams 77 and 78 are properly fixed upon the shaft with reference to each other, a rotation of the shaft, together with the co-operation of the springs 76 and 85 will operate the arms 67 and 68 to move the fingers into and out of the path of movement of the towels upon the supporting bars 32 as they emerge from the drums. The movement of said fingers with reference to the feeding of the strip and the discharge of towels is so timed (see Figs. 6 and 7) that the fingers will raise the rear end or lap b' of one towel to permit the adjacent lap b² of the succeeding towel to move within the last fold of the preceding towel, the zigzag form which the towels assume and which enable such interfolding of the ends of the towels being accomplished by the transverse folding of the longitudinally folded strip by the toothed drums 6 and 7. The fingers 9 and 10 thus also serve to assist the towels in maintaining an upright position in such zigzag form while they are moved along the guide bars 32 (Fig. 3) into their chute 2.

In order that the towels may be readily associated together in interfolded relation, the teeth 45 of the drums 6 and 7 are preferably arranged to fold and sever the strip so that the leading end laps of the towels when formed are somewhat shorter and are inclined substantially less than their next adjacent laps as shown in Fig. 6. This is accomplished by forming some of the teeth 45 of one of the drums (herein the upper drum) with substantially flat faces 45ª which are shorter than the faces of the remaining teeth, while the teeth of the other drum are spaced apart to form depressions 45ᵇ to receive said flat faced teeth. Thus by arranging the cutting blades at the forward or leading edges of such flat faced teeth, it will be apparent that the leading end lap of each towel when formed—the first fold having been made by the following edge of the flat faced tooth and the corresponding edge of the depression—will be inclined very slightly from a horizontal plane and will form a greater angle with the next adjacent lap than said adjacent lap forms with the succeeding lap. Consequently the following end lap of one towel need only be lifted by the operating fingers 9 and 10 a distance sufficient to permit the short leading end lap of the succeeding towel to pass into the last fold of the preceding towel, and when the folded towels are pushed along the guide bars 32 into the chute 2 they assume a compact form in upright position and in interfolded relation.

Obviously other forms and arrangements of teeth on the folding elements may be employed to form the towels in such a manner as to facilitate the association thereof in interfolded relation, as for instance, the leading end laps may be so arranged as to incline downwardly and forwardly and the following end laps may be arranged to incline upwardly and rearwardly to such a degree as to enable the towels to be readily interfolded with each other.

Referring to Figs. 1, 1ª and 7, the chute 2 is substantially rectangular in form, open at both ends with a forward flared end 2ª and a top wall 87 having a central longitudinal slot 88 therein. At both sides of the slot the top wall is provided with a plurality of openings 89 equidistantly spaced apart. A plate 90 of celluloid or the like and having a plurality of downwardly and rearwardly extending yieldable tongues 91 is arranged to be placed upon the top of the container with its tongues protruding through the openings 89 therein. Thus, when the completed towels are discharged into the chute, the tongues 91 yield to permit the towels to pass and serve to hold them against falling forwardly from upright position, and when it is desired to remove the towels from the chute, they may be readily slid rearwardly by the operator with his fingers inserted through the longitudinal slot 88.

I claim as my invention:

1. A machine of the character described having, in combination, means for imparting a longitudinal fold to a strip, means for transversely folding the strip into zigzag form, means for severing the strip into separate sheets, said folding means discharging the separate sheets in zig-zag form and in upright position, and means operating upon the separate sheets after they are discharged from the folding means to interfold the adjacent ends of contiguous sheets.

2. A machine of the character described having, in combination, means for transversely folding a continuous strip, means for severing the strip into separate sheets, said folding means discharging the separate sheets in zig-zag form and in upright position, and means for operating upon the separate sheets after they are discharged from the folding means to interfold the adjacent ends of contiguous sheets.

3. A machine of the character described having, in combination, means for imparting a longitudinal fold to a paper strip, means for transversely folding the strip, means for severing the strip into separate sheets, said folding means discharging the sheets in zig-zag form and in upright position, and means for operating upon the separate sheets after they are discharged from the folding means to interfold the adjacent ends of contiguous sheets.

4. A machine of the character described having, in combination, a pair of rotary elements located one above the other for drawing a single continuous strip of paper or the like and transversely folding the same, means for severing the strip into separate sheets, and means operable upon the sheets as they emerge in a horizontal direction from between the rotary elements whereby to associate the severed sheets together in interfolded relation.

5. A machine of the character described having, in combination, a pair of intermeshing toothed drums arranged one above the other and adapted to transversely fold a continuous strip, means associated with said drums for severing the strip into separate sheets, and means operatively associated with the lower drum and engaging with the sheets as they emerge from between the drums in a horizontal direction to associate them in interfolded relation.

6. A machine of the character described having, in combination, a pair of rotating elements arranged one above the other and having intermeshing teeth for transversely folding a strip of paper into zigzag form, means for severing the strip into separate sheets, a horizontal support adapted to receive said folded sheets in substantially upright position, and means for operating upon the folded sheets to associate them together in upright relation.

7. A machine of the character described having, in combination, means for transversely folding a continuous strip of paper or the like into zigzag form, means for severing the strip into separate sheets, means for operating upon the folded sheets after they are discharged from the folding means to associate them together in upright position, and a container for receiving the sheets in such position.

8. A machine of the character described having, in combination, means for transversely folding a continuous strip of paper into zigzag form, means for severing the strip into separate sheets, means for operating upon the folded sheets after they are discharged from the folding means to associate them together in interfolded relation, and a chute into which said sheets are discharged in their interfolded relation.

9. A machine of the character described having, in combination, means for transversely folding a continuous strip of paper or the like into zigzag form, means for severing the strip into separate sheets, means for operating upon the folded sheets after they are discharged from the folding means to associate them together in upright position and in interfolded relation, and a container arranged to receive said sheets and to support them in upright position in their interfolded relation.

10. A machine of the character described having, in combination, two pairs of rolls, means for guiding a strip of paper from one pair to the other to form a fold therein, a pair of rotating elements arranged to form another fold in the strip, said elements being also arranged to draw the strip through the two pairs of rolls, one roll of each of said pairs being movable out of operative engagement with the other.

11. A machine of the character described having, in combination, means for transversely folding a continuous strip, means for severing the strip into separate sheets, a finger for operating upon the folded sheet after it is discharged from the folding means to maintain it in its folded form and to associate adjacent sheets together in interfolded relation, and means for actuating the folding means and the finger.

12. A machine of the character described having, in combination, means for transversely folding a continuous strip, means for severing the strip into separate folded sheets, a finger for operating upon the folded sheets to associate them together in interfolded relation, a frame upon which said finger is supported, a second frame upon which the first mentioned frame is slidably supported, and cam mechanism for moving each of said frames.

13. A machine of the character described having, in combination, a pair of rotatable elements for transversely folding a continuous strip, means for severing the strip into separate folded sheets, a finger for operating upon the folded sheets to associate them together in interfolded relation, a frame upon which said finger is supported, a second frame upon which the first mentioned frame is slidably supported, a shaft geared to one of said rotatable folding elements and having a cam thereon for moving one frame vertically, and a second cam for moving the other frame horizontally.

14. A machine of the character described having, in combination, a pair of rotatable drums having a plurality of intermeshing teeth for transversely folding a continuous strip, means for severing the strip into separate folded sheets, a finger, an arm arranged to support said finger, a frame carrying said arm, a second frame carrying the first mentioned frame, springs tending to hold said frames normally in inoperative position, and means for moving the frames against the action of their springs whereby said finger is moved into and out of the path of movement of the sheets.

15. A machine of the character described having, in combination, means for transversely folding a continuous strip, means for severing the strip into separate folded sheets, a pair of fingers, and means for alternately moving the fingers into and out of the path of movement of the sheets to interfold them.

16. A machine of the character described having, in combination, means for producing separate folded sheets, a pair of fingers, and means for alternately moving the fingers into and out of the path of movement of the sheets to associate them together.

17. A machine of the character described having, in combination, means for transversely folding a continuous strip including a pair of rotatable elements with intermeshing teeth, means for severing said strip into separate sheets, and means for operating upon the separated sheets to associate them together in interfolded relation, said teeth on the drums being arranged to impart a zigzag form to the separated sheets with the leading end lap of the sheet inclined to a substantially less degree than the remaining laps of the sheet.

18. A machine of the character described having, in combination, means for transversely creasing a continuous strip to cause it to assume a zigzag form including a pair of rotatable elements having intermeshing teeth, means for severing said strip into separate sheets, and means for operating upon the separate sheets to associate them together in interfolded relation, one of said drums being provided with a plurality of substantially flat faced teeth whereby the leading edge of each folded sheet assumes a position in a plane substantially lower than the plane assumed by the uppermost crease in the sheet.

19. A machine of the character described having, in combination, means for imparting a zigzag form to a series of sheets with one end lap of each sheet forming a greater angle with its adjacent lap than said adjacent lap forms with the next adjacent lap, and means for lifting one end lap of each sheet whereby to effect its association in interfolded relation with contiguous sheets.

20. A machine of the character described having, in combination, means for transversely folding a continuous strip into zigzag form, means for severing the folded strip into separate sheets, each sheet being so formed that one end lap forms a greater angle with its adjacent lap than said adjacent lap forms with the next adjacent lap, and means for lifting one end lap of each sheet to enable the adjacent end lap of the contiguous sheet to become interfolded therewith as the sheets are moved into compact relationship.

21. A machine of the character described having, in combination, means for longitudinally folding a sheet, means for imparting a zigzag form to the sheet with one end lap of the sheet forming a greater angle with its adjacent lap than said adjacent lap forms with the next adjacent lap, and means for lifting one end lap of the sheet to enable the association of the sheet with other similarly folded sheets in interfolded relation.

22. A machine of the character described having, in combination, means for longitudinally folding a strip, means for imparting a zigzag form to the strip, and means for severing the folded strip into separate sheets, each sheet being so formed that one end lap forms a greater angle with its adjacent lap than said adjacent lap forms with the next adjacent lap, and means for lifting one end lap of each sheet whereby to enable the association of the sheets in interfolded relation.

23. A machine of the character described having, in combination, means for imparting a zigzag form to a strip, means for severing the strip into separate sheets, and a container for receiving the separate sheets when formed, each sheet being so formed that one end lap forms a greater angle with its adjacent lap than said adjacent lap forms with the next adjacent lap, and means for lifting one end lap of each sheet whereby to enable the association of the sheets in interfolded relation.

24. A machine of the character described having, in combination, means for imparting a zigzag form to a strip including a pair of rotatable elements having a plurality of intermeshing teeth, and means operatively associated with said teeth for severing the strip into sheets with one end lap of each sheet substantially shorter than its adjacent lap.

25. A machine of the character described having, in combination, means for imparting a zigzag form to a sheet with one end lap of the sheet substantially shorter than its adjacent lap, and means for lifting one end lap of the sheet whereby to enable the association of the sheet with other similarly folded sheets in interfolded relation.

26. A machine of the character described having, in combination, a support, means for producing a series of folded sheets and discharging them onto the support in zigzag form and in upright position with the leading end lap of each sheet extending downwardly and made substantially shorter than its adjacent lap, and the rear end lap of each sheet extending upwardly and forming a greater angle with its adjacent lap than said adjacent lap forms with the next adjacent lap, whereby when the sheets are moved into compact relationship they will become interfolded.

27. A machine of the character described having, in combination, a support, means for producing a series of folded sheets and discharging them onto the support in zigzag form and in upright position with one end lap of each sheet substantially shorter than its adjacent lap and one end lap forming a greater angle with its adjacent lap than said adjacent lap forms with the next adjacent lap, whereby when the sheets are moved into compact relationship they will become interfolded.

28. A machine of the character described having, in combination, means for producing a series of sheets folded into zig-zag form, a pair of fingers, and means for actuating the fingers whereby to lift one end lap of each sheet to enable the adjacent end lap of a contiguous sheet to become interfolded therewith when the sheets assume a compact relationship.

29. A machine of the character described having, in combination, means for producing a series of sheets folded into zig-zag form, and means including a finger operable to lift one end lap of each sheet upon its discharge from the folding means to enable the adjacent end lap of a contiguous sheet to become interfolded therewith when the sheets assume a compact relationship.

30. A machine of the character described having, in combination, means for transversely folding a continuous strip of paper, means for severing the strip into separate sheets, a substantially horizontal support, said folding means being adapted to discharge the folded sheets separately onto said support, and means for operating on the sheets upon the support to interfold them.

31. A machine of the character described comprising, in combination, means for transversely folding a continuous strip of paper, means operatively associated with said folding means to sever said strip into separate sheets, a support, said folding means being adapted to discharge the separate folded sheets onto said support in upright position, means operable upon said sheets to interfold them, and means for receiving the interfolded sheets from the support so as to maintain them in upright position in a compact form.

32. A machine of the class described comprising, in combination, feeding means for a single continuous strip of paper, folding means comprising a pair of drums having intermeshing teeth for creasing said strip, cutting means associated with said drums for severing the strip into separate sheets, and means for interfolding adjacent end portions of said sheets after they are discharged from said folding means.

In testimony whereof, I have hereunto set my hand.

EDMUND BRUDER.